US012338051B2

(12) United States Patent
Wise et al.

(10) Patent No.: US 12,338,051 B2
(45) Date of Patent: Jun. 24, 2025

(54) SYSTEM FOR PORT AND TUBE HOLDER ASSEMBLY ATTACHMENT DEVICE

(71) Applicant: LIFE TECHNOLOGIES CORPORATION, Carlsbad, CA (US)

(72) Inventors: Tristan Wise, West Nibley, UT (US); Charles Rhodes, Preston, UT (US)

(73) Assignee: LIFE TECHNOLOGIES CORPORATION, Carlsbad, CA (US)

(*) Notice: Subject to any disclaimer, the term of this patent is extended or adjusted under 35 U.S.C. 154(b) by 0 days.

(21) Appl. No.: 18/313,262

(22) Filed: May 5, 2023

(65) Prior Publication Data

US 2023/0286723 A1 Sep. 14, 2023

Related U.S. Application Data

(63) Continuation of application No. 17/809,788, filed on Jun. 29, 2022, now Pat. No. 11,679,924, which is a (Continued)

(51) Int. Cl.

*B65D 77/06* (2006.01)
*A61J 1/10* (2006.01)

(Continued)

(52) U.S. Cl.

CPC .............. *B65D 77/067* (2013.01); *B01L 1/00* (2013.01); *B01L 1/04* (2013.01); *B01L 3/00* (2013.01); *B01L 3/52* (2013.01); *B01L 9/00* (2013.01); *B01L 99/00* (2013.01); *B65D 83/28* (2013.01); *B65D 83/7714* (2025.01); *A61J 1/10* (2013.01); *B01L 9/04* (2013.01); *B01L 9/50* (2013.01);

(Continued)

(58) Field of Classification Search

CPC .. B65D 77/067; B65D 83/0077; B65D 83/28; B65D 2583/005; B65D 2590/0066; B01L 3/52; B01L 9/04; B01L 9/50; B01L 2200/023; B01L 2200/025; B01L 2200/18; B01L 2300/0848; B01L 2300/123; B01L 1/04; B01L 1/00; B01L 3/00; B01L 9/00; B01L 99/00; A61J 1/10

See application file for complete search history.

(56) References Cited

U.S. PATENT DOCUMENTS

| | | | |
|---|---|---|---|
| 301,753 | A | 7/1884 | H. T. et al. |
| 508,408 | A | 11/1893 | Cogswell |

(Continued)

FOREIGN PATENT DOCUMENTS

| | | | |
|---|---|---|---|
| CN | 1607981 | A | 4/2005 |
| CN | 102470365 | A | 5/2012 |

(Continued)

*Primary Examiner* — Frederick C Nicolas

(74) *Attorney, Agent, or Firm* — Anitha Shankar Narayan

(57) ABSTRACT

A tube holder assembly includes a base plate, an attachment plate, and an optional securing element. The base plate may include guides into which protrusions of the attachment plate slide to alter the positioning apparatus from an open position to a closed position. The base plate also includes receivers to receive tubular members, which have their movement restrained by the receivers and the securing elements in the closed position. The tube holder assembly may also include a latch to help maintain the closed position during operation.

13 Claims, 18 Drawing Sheets

Related U.S. Application Data continuation of application No. 17/005,071, filed on Aug. 27, 2020, now Pat. No. 11,414,252, which is a continuation of application No. 16/278,845, filed on Feb. 19, 2019, now Pat. No. 10,759,584.

(60) Provisional application No. 62/637,462, filed on Mar. 2, 2018.

(51) Int. Cl.

| | |
|---|---|
| ***B01L 1/00*** | (2006.01) |
| ***B01L 1/04*** | (2006.01) |
| ***B01L 3/00*** | (2006.01) |
| ***B01L 9/00*** | (2006.01) |
| ***B01L 9/04*** | (2006.01) |
| ***B01L 99/00*** | (2010.01) |
| ***B65D 83/00*** | (2006.01) |
| ***B65D 83/28*** | (2025.01) |

(52) U.S. Cl.

CPC ... *B01L 2200/023* (2013.01); *B01L 2200/025* (2013.01); *B01L 2200/18* (2013.01); *B01L 2300/0848* (2013.01); *B01L 2300/123* (2013.01); *B65D 2583/005* (2013.01); *B65D 2590/0066* (2013.01)

(56) References Cited

U.S. PATENT DOCUMENTS

| | | | | |
|---|---|---|---|---|
| 797,215 | A | 8/1905 | Osborne et al. | |
| 901,034 | A | 10/1908 | Patterson | |
| 935,075 | A | 9/1909 | D. D. Wells | |
| 1,118,738 | A | 11/1914 | Carroll | |
| 1,272,222 | A | 7/1918 | Clayton | |
| 2,315,365 | A | 3/1943 | Christy | |
| 2,579,685 | A | 12/1951 | Loose | |
| 2,649,991 | A | 8/1953 | Woock | |
| 2,718,985 | A | 9/1955 | Tamminga | |
| 2,720,998 | A | 10/1955 | Potter | |
| 2,805,793 | A | 9/1957 | Crisafulli | |
| 2,826,329 | A | 3/1958 | Beckner | |
| 2,894,666 | A | 7/1959 | Campbell, Jr. | |
| 2,916,161 | A | 12/1959 | Schaefer | |
| 2,973,119 | A | 2/1961 | Brooks | |
| 3,096,551 | A | 7/1963 | Shoberg | |
| 3,105,617 | A | 10/1963 | Felldin | |
| 3,212,681 | A | 10/1965 | Weikert | |
| 3,343,719 | A | 9/1967 | Kastamo et al. | |
| 3,477,686 | A | 11/1969 | Engelsher et al. | |
| 3,481,511 | A | 12/1969 | Metke | |
| 3,735,898 | A | 5/1973 | Smith | |
| 3,735,989 | A | 5/1973 | Dattilo | |
| 3,874,569 | A | 4/1975 | Fossett et al. | |
| 3,908,864 | A | 9/1975 | Capper | |
| 3,960,294 | A | 6/1976 | Bernard | |
| 3,982,724 | A | 9/1976 | Citrin | |
| 4,119,263 | A | 10/1978 | Cuthbertson et al. | |
| 4,271,987 | A | 6/1981 | Eriksson et al. | |
| 4,390,051 | A | 6/1983 | Cuthbertson | |
| 4,436,277 | A | 3/1984 | Robak et al. | |
| D274,127 | S | 6/1984 | Einhorn et al. | |
| 4,591,065 | A | 5/1986 | Foy | |
| 4,666,064 | A | 5/1987 | Hoehn | |
| 4,785,974 | A | 11/1988 | Rudick et al. | |
| 4,804,118 | A | 2/1989 | Mullen et al. | |
| 4,807,845 | A | 2/1989 | Darnell | |
| 4,817,824 | A | 4/1989 | LaFleur et al. | |
| 4,883,201 | A | 11/1989 | Poulton | |
| 4,953,754 | A | 9/1990 | Credle, Jr. | |
| 4,968,078 | A | 11/1990 | Fitzwater | |
| 5,000,352 | A | 3/1991 | Cleland | |
| 5,033,649 | A | 7/1991 | Copeland et al. | |
| 5,205,772 | A | 4/1993 | Kennard et al. | |
| 5,265,772 | A | 11/1993 | Bartasevich et al. | |
| 5,333,777 | A | 8/1994 | Roth | |
| 5,379,917 | A | 1/1995 | Brown et al. | |
| 5,383,576 | A | 1/1995 | Richter et al. | |
| 5,402,915 | A | 4/1995 | Hogan | |
| 5,425,400 | A | 6/1995 | Szatmary | |
| D371,497 | S | 7/1996 | Cottone | |
| 5,531,352 | A | 7/1996 | Kraft et al. | |
| 5,549,707 | A | 8/1996 | Weaver | |
| 5,584,327 | A | 12/1996 | Thomas et al. | |
| 5,595,324 | A | 1/1997 | Brown et al. | |
| 5,673,817 | A | 10/1997 | Mullen et al. | |
| 5,802,689 | A | 9/1998 | Sano | |
| 5,810,204 | A | 9/1998 | Devlin et al. | |
| 5,873,498 | A | 2/1999 | Moore et al. | |
| 5,897,012 | A | 4/1999 | Sortwell | |
| 5,944,227 | A | 8/1999 | Schroeder et al. | |
| 5,947,337 | A | 9/1999 | Worth | |
| 5,988,422 | A | 11/1999 | Vallot | |
| D421,715 | S | 3/2000 | Won | |
| 6,036,058 | A | 3/2000 | Chou | |
| 6,068,162 | A | 5/2000 | De Winter et al. | |
| 6,076,457 | A | 6/2000 | Vallot | |
| D436,814 | S | 1/2001 | Gore | |
| 6,186,932 | B1 | 2/2001 | Vallot | |
| 6,196,420 | B1 | 3/2001 | Gutierrez et al. | |
| 6,202,708 | B1 | 3/2001 | Bynum | |
| 6,223,903 | B1 | 5/2001 | Mansouri | |
| 6,253,806 | B1 | 7/2001 | Sperry et al. | |
| 6,286,700 | B1 | 9/2001 | Davidson | |
| 6,302,299 | B1 | 10/2001 | Baker et al. | |
| 6,345,734 | B2 | 2/2002 | Schalow et al. | |
| D454,777 | S | 3/2002 | Yoshiguchi | |
| D465,408 | S | 11/2002 | Man et al. | |
| 6,543,495 | B2 | 4/2003 | Hougland | |
| 6,634,783 | B2 | 10/2003 | Baron | |
| 6,659,132 | B2 | 12/2003 | Smith et al. | |
| 6,929,155 | B1 | 8/2005 | Sayers | |
| D513,172 | S | 12/2005 | Rutsky | |
| 7,284,579 | B2 | 10/2007 | Elgan et al. | |
| D563,781 | S | 3/2008 | Carnevali | |
| 7,588,161 | B2 | 9/2009 | Elgan et al. | |
| 7,922,848 | B2 | 4/2011 | Ishida et al. | |
| 8,272,410 | B2 * | 9/2012 | Elgan .................. | B65D 77/061 141/10 |
| 8,342,368 | B2 | 1/2013 | Ophardt et al. | |
| 8,376,310 | B2 | 2/2013 | Veltrop et al. | |
| 8,534,497 | B2 | 9/2013 | Veltrop et al. | |
| 8,636,176 | B2 | 1/2014 | Malin et al. | |
| 9,533,869 | B2 | 1/2017 | Veltrop et al. | |
| D793,852 | S | 8/2017 | Rathman | |
| 9,717,354 | B2 * | 8/2017 | Gehl ..................... | G01F 15/003 |
| 9,839,886 | B2 * | 12/2017 | Staheli .................. | B01F 35/513 |
| D808,788 | S | 1/2018 | Ackerman | |
| 9,988,257 | B2 | 6/2018 | Schneberger | |
| 10,060,539 | B2 | 8/2018 | Wilson et al. | |
| D835,505 | S | 12/2018 | De Los Santos | |
| 10,759,584 | B2 | 9/2020 | Wise et al. | |
| 11,414,252 | B2 | 8/2022 | Wise et al. | |
| 11,679,924 | B2 | 6/2023 | Wise et al. | |
| 2004/0027912 | A1 | 2/2004 | Bibbo et al. | |
| 2004/0074922 | A1 | 4/2004 | Bothor et al. | |
| 2004/0149766 | A1 | 8/2004 | Karpisek | |
| 2005/0045639 | A1 | 3/2005 | Thorpe | |
| 2006/0145105 | A1 | 7/2006 | Ishida et al. | |
| 2010/0106101 | A1 | 4/2010 | Fisher et al. | |
| 2011/0271646 | A1 | 11/2011 | Elgan et al. | |
| 2012/0067920 | A1 | 3/2012 | Veltrop et al. | |
| 2013/0237956 | A1 | 9/2013 | Travis et al. | |
| 2015/0117142 | A1 | 4/2015 | Staheli et al. | |

FOREIGN PATENT DOCUMENTS

| | | | |
|---|---|---|---|
| CN | 203765576 | U | 8/2014 |
| CN | 105508761 | A | 4/2016 |
| CN | 206764915 | U | 12/2017 |
| CN | 206802556 | U | 12/2017 |
| DE | 944096 | C | 6/1956 |
| DE | 4039836 | A1 | 6/1992 |
| EP | 72783 | A1 | 2/1983 |

(56) References Cited

FOREIGN PATENT DOCUMENTS

| | | | |
|---|---|---|---|
| EP | 586994 | A1 | 3/1994 |
| GB | 2069461 | A | 8/1981 |
| GB | 2078678 | A | 1/1982 |
| JP | S57-194960 | U | 12/1982 |
| JP | 2004089307 | A | 3/2004 |
| JP | 2013539650 | A | 10/2013 |
| KR | 19980060677 | U | 11/1998 |
| WO | WO-93/17930 | A1 | 9/1993 |

* cited by examiner

SYSTEM FOR PORT AND TUBE HOLDER ASSEMBLY ATTACHMENT DEVICE

CROSS-REFERENCE TO RELATED APPLICATIONS

This application is a continuation of U.S. application Ser. No. 17/809,788, filed on Jun. 29, 2022, now U.S. Pat. No. 11,679,924, issued Jun. 20, 2023, which is a continuation of U.S. application Ser. No. 17/005,071, filed Aug. 27, 2020, now U.S. Pat. No. 11,414,252, issued on Aug. 16, 2022, which is a continuation of U.S. application Ser. No. 16/278,845, filed Feb. 19, 2019, now U.S. Pat. No. 10,759,584, issued on Sep. 1, 2020, which claims benefit of U.S. Provisional Application No. 62/637,462, filed Mar. 2, 2018, which are incorporated herein by specific reference.

BACKGROUND OF THE INVENTION

1. The Field of the Invention

The present invention relates to bins for use in storing, moving, processing and/or dispensing fluids.

2. The Relevant Technology

The biopharmaceutical industry uses large quantities of different types of fluids in their research, testing, and production of final product. Examples of such fluids include media, buffers, and reagents. Critical to the biopharmaceutical industry is the ability to easily transport, process, and dispense such fluids while preventing unwanted contamination. Historically such fluids have been held in stainless steel containers which required cleaning and sterilization between uses. To avoid the burden of repeated tank cleaning, current approaches to the storage and dispensing of fluids have utilized fluid dispensing bins.

Conventional fluid dispensing bins comprise an open top bin having a fixed floor with a fixed porthole extending therethrough. A disposable bag having a fluid line extending therefrom is disposed within the bin so that the fluid line extends out of the porthole. The disposable bag can be pre-sterilized so as to prevent contamination of fluids that pass there-through. Once the bag is filled with fluid, the bag provides a ready supply of the fluid for desired processing. Once the bag is empty, the bag can be replaced with a new bag without cleaning.

Although conventional fluid dispensing bins are useful, they have a number of shortcomings. For example, conventional fluid dispensing bins have a fixed floor with a fixed porthole configuration so that the customer is required to purchase from the bin manufacturer the corresponding bag that is designed to fit the bin. As a result, customers are limited in their ability to purchase bags from other producers in that the bags may not fit properly within the bin. Furthermore, due to the fixed nature of the bins, customers are unable to request customized bag designs that may be more useful under different processing or dispensing conditions. In addition, bags are often preassembled and then sterilized with other structures such as filters. However, once a filter or other structure is secured to the fluid line extending from a bag, the bag can no longer be used with the bin in that the filter cannot be passed through the fixed port hole on the floor of the bin.

Accordingly, there is an ongoing need in the art for fluid dispensing bins that can be easily used with a broad range of bag designs and bag assemblies.

The biopharmaceutical industry has been increasingly using disposable media bags for product processing. The media bags, being filled with liquid, require a media bag holder to contain the filled media bag. The media bags may have a combination of top and bottom tubing in various quantities and configurations. The bottom tubing requires a means of passing through the bottom of the bag holder and being held in place. One prior method to accommodate media bag tubing is to provide fixed holes in the bottom of the bag holder with either no retaining device or simple clamping type devices in line with the holes underneath the bottom of the bag holder.

Another method is two movable bottom pieces, each with one half of the required hole, which when brought together clamp onto the media bag tubing. Fixed holes in the bottom of the media bag holder allow for only one configuration of media bag tubing, both size of tubing and position. The clamping devices must be placed on the bottom of the bag holder which requires reaching underneath the bag holder, which may only be inches off the floor, making it difficult to see and access.

Two movable bottom pieces do allow changing of pieces to accommodate various tubing configurations, but require locking devices which must also be placed on the bottom of the bag holder and are often difficult to see and access.

BRIEF SUMMARY

Described herein are embodiments of a fluid line retainer that centralizes the ports during deployment of the bag and secures them in place such that they function properly once the bag is deployed. When draining, the placement of the ports affects the ability of the bag to drain properly. The bottom of the bin slopes toward the front and the ports are at the front of the bins and are held in place by the port holders. The port holders may have multiple design options. One embodiment is a 'pinball'-style design that has springs to automatically adjust to the size of tubing that is placed into the port holder. Other embodiments include a screw-style design and a cover-style design. The screw-style and pinball-style designs may adjust from 1.5" tubing and smaller, whereas the cover-style design may just hold the tubing in place.

BRIEF DESCRIPTION OF THE SEVERAL VIEW OF THE DRAWINGS

To easily identify the discussion of any particular element or act, the most significant digit or digits in a reference number refer to the figure number in which that element is first or most clearly introduced.

DETAILED DESCRIPTION

Figure 1:
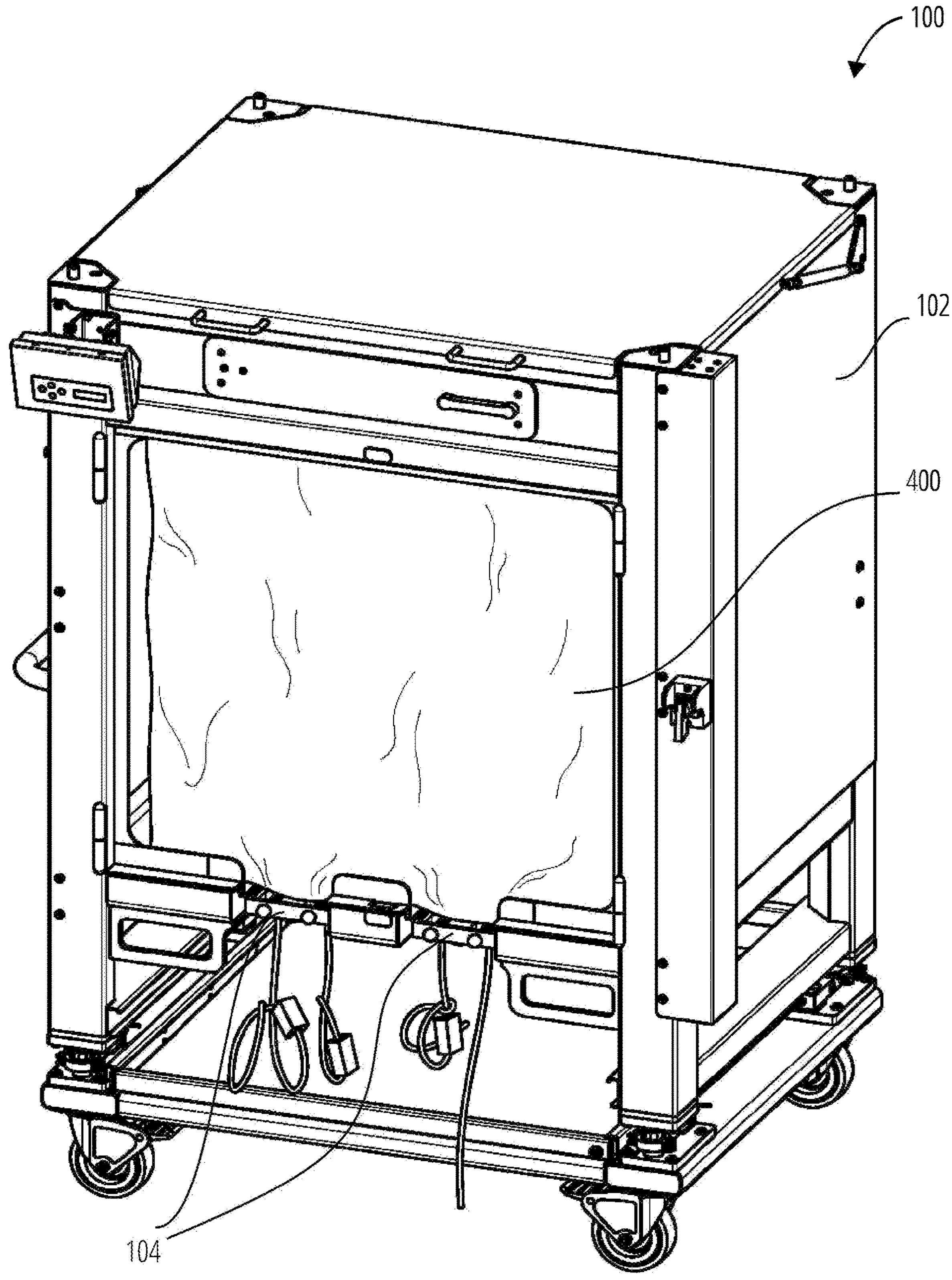
FIG. 1 illustrates a front perspective view of an embodiment of a liquid dispensing system 100.
Figure 2:
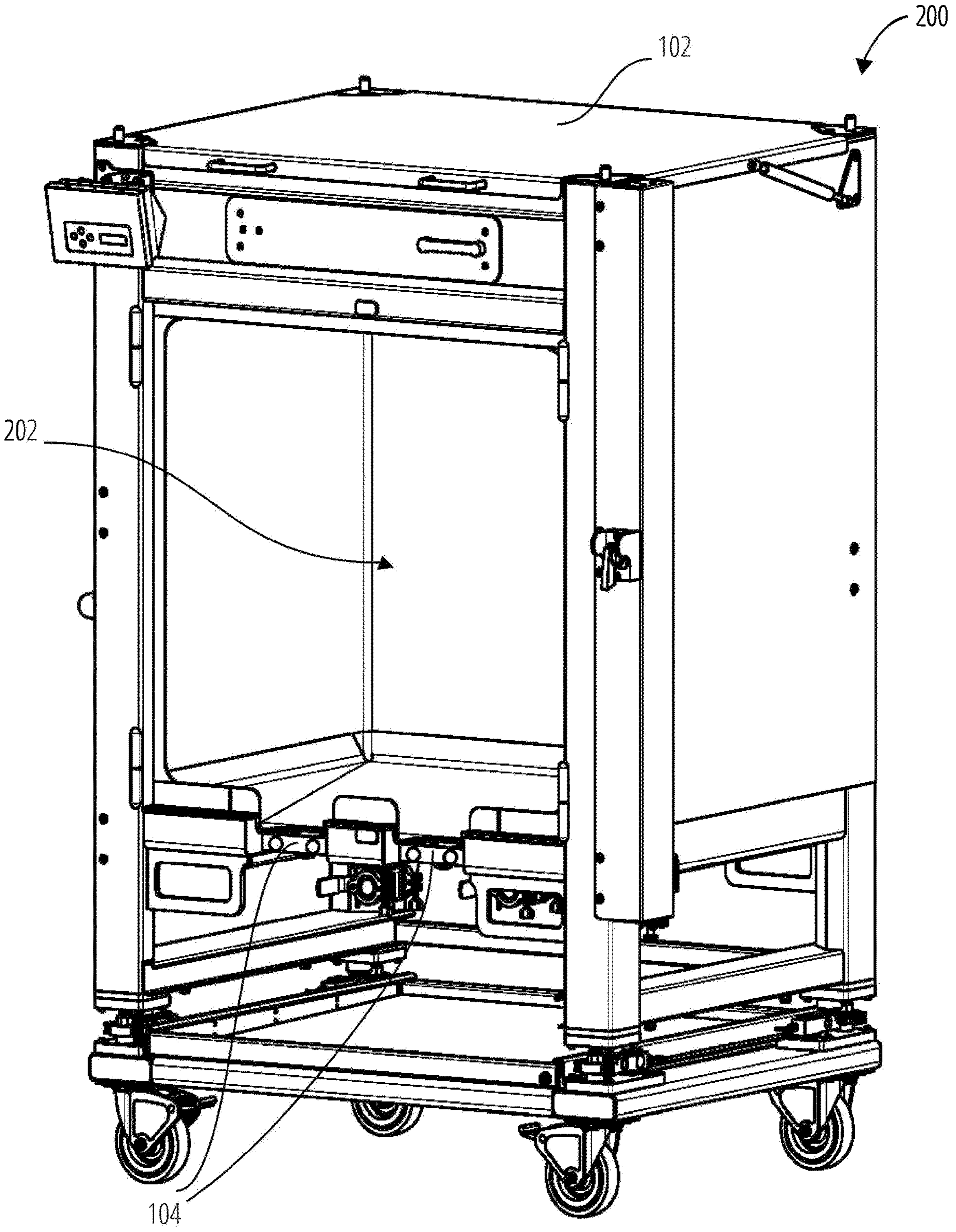
FIG. 2 illustrates a front perspective view of an embodiment of a cabinet 200.
Figure 3:
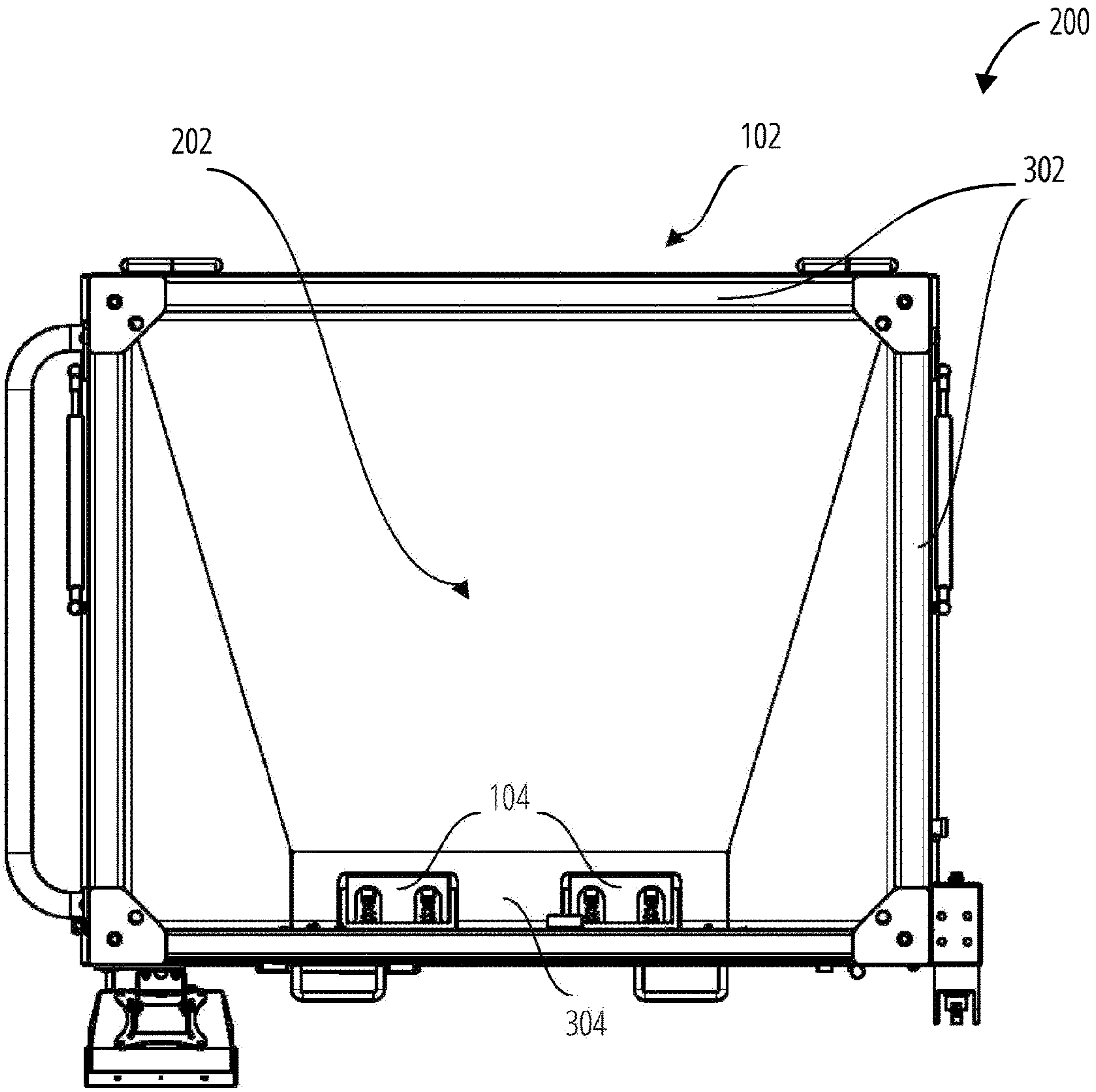
FIG. 3 illustrates a top view of an embodiment of a cabinet 200.
Figure 4:
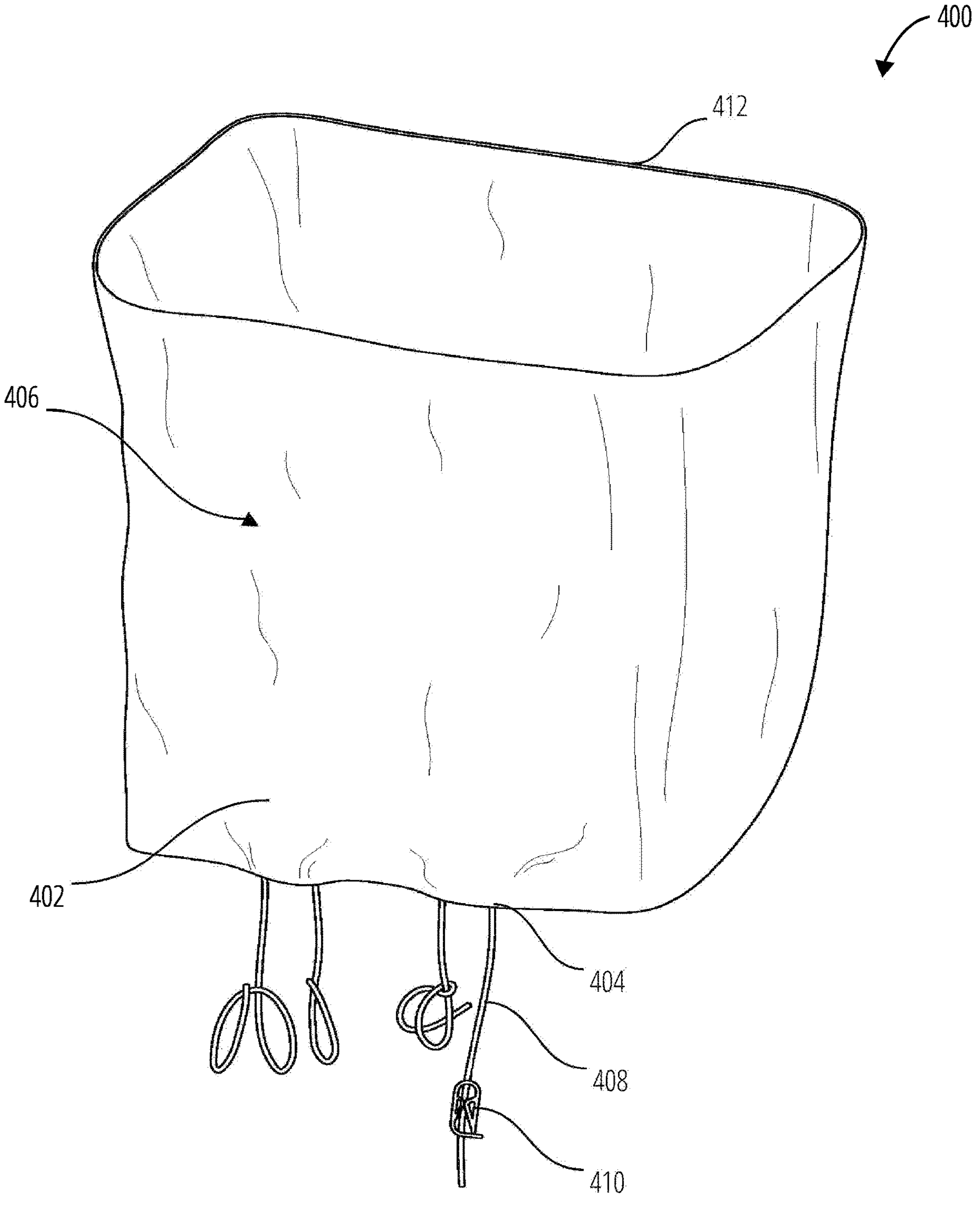
FIG. 4 illustrates an embodiment of a flexible container 400.
Figure 5:
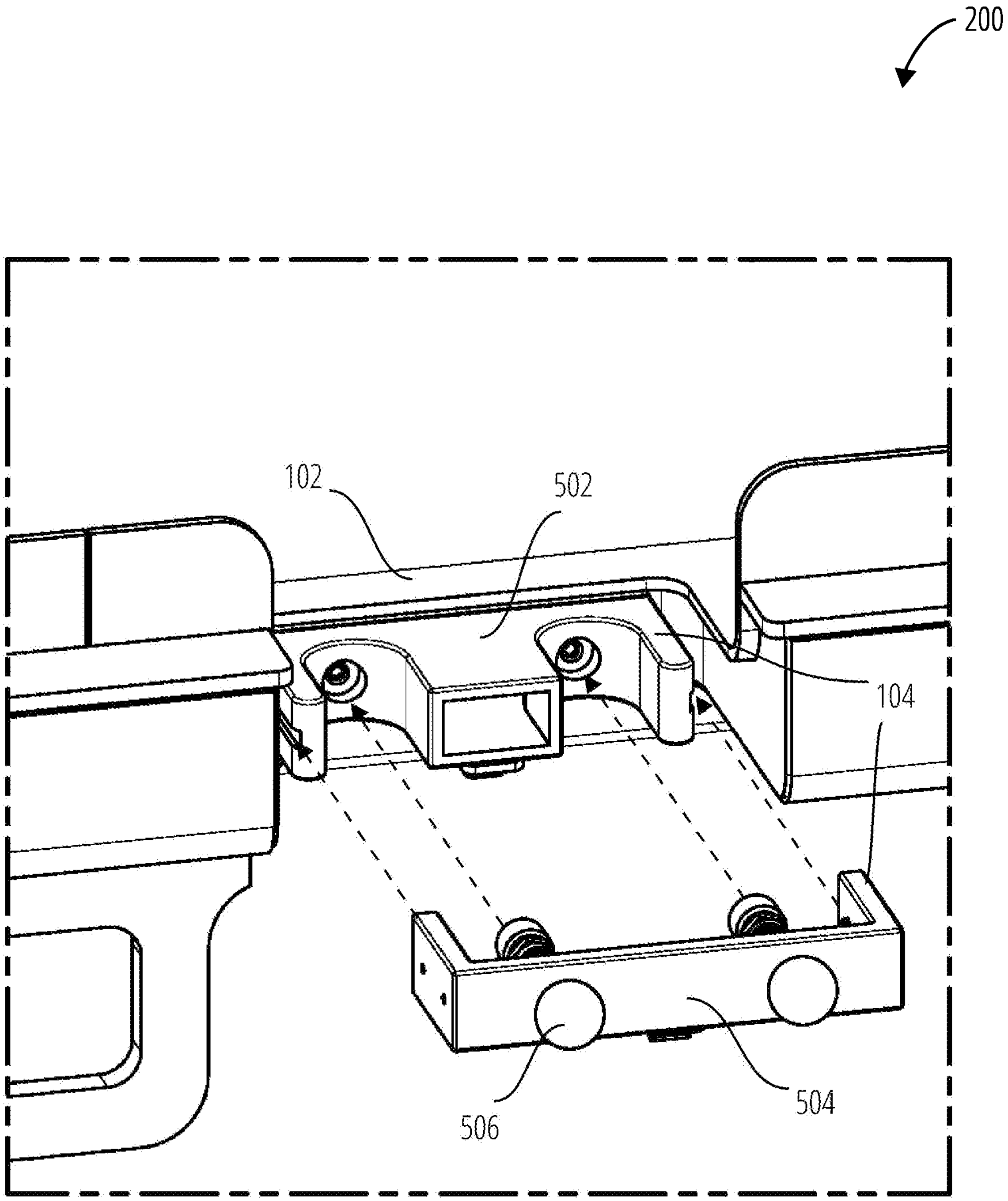
FIG. 5 illustrates an enhanced perspective view of an embodiment of a cabinet 200.
Figure 6:
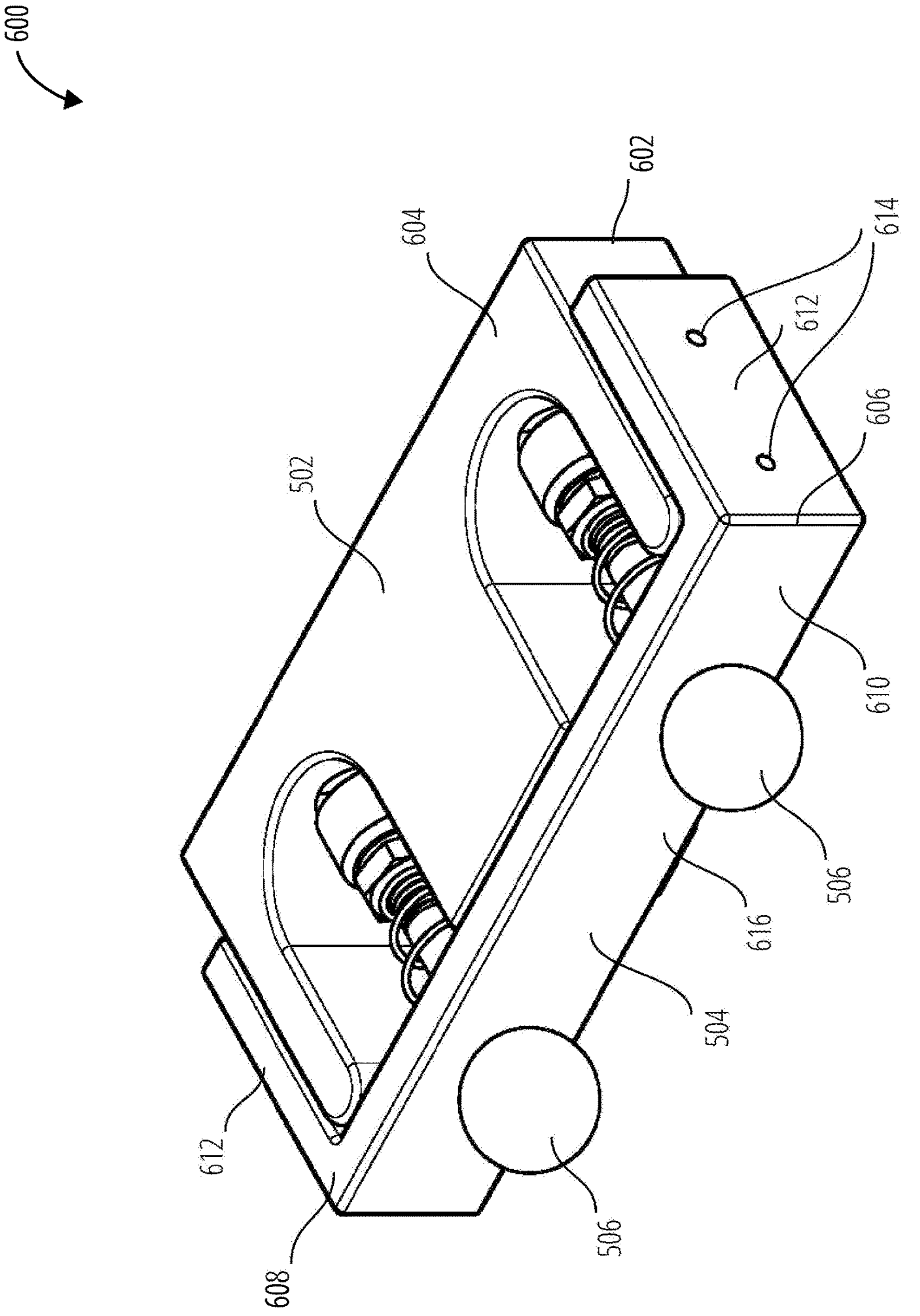
FIG. 6 illustrates a top perspective assembly view of an embodiment of a pinball-style tube holder 600 in a closed position.
Figure 7:
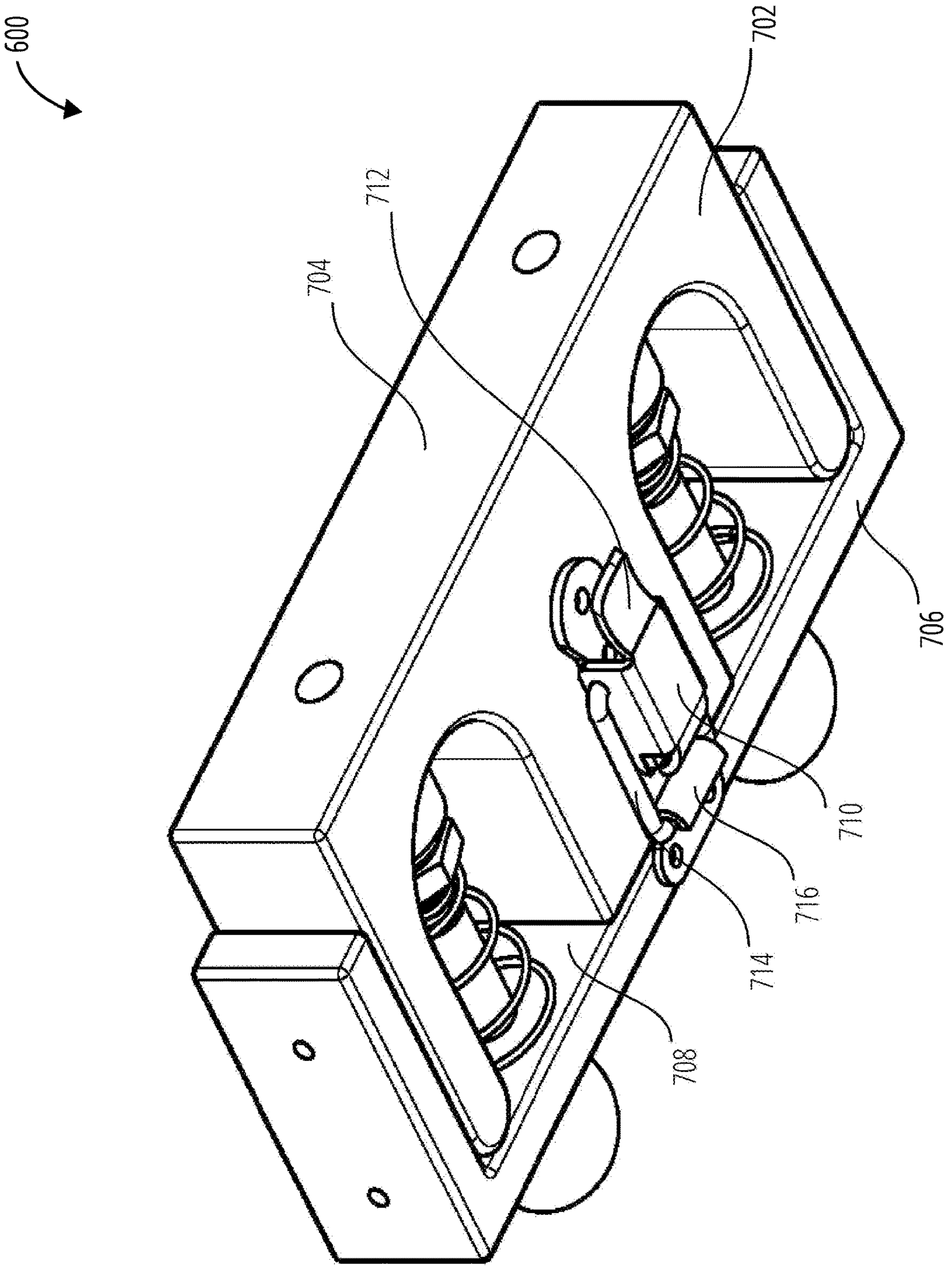
FIG. 7 illustrates a bottom perspective assembly view of an embodiment of a pinball-style tube holder 600 in a closed position.
Figure 8:
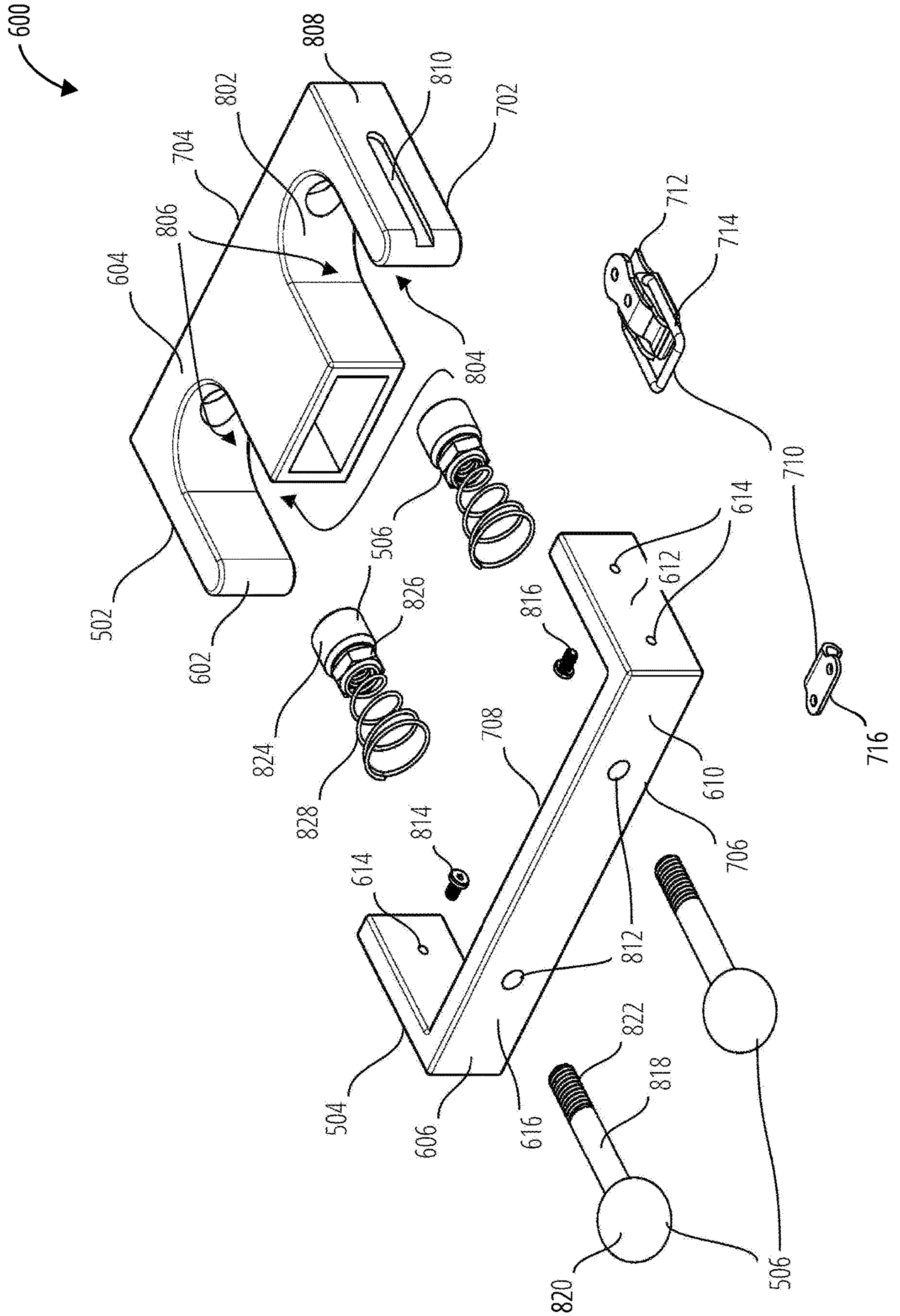
FIG. 8 illustrates a top perspective exploded view of an embodiment of a pinball-style tube holder 600.
Figure 9:
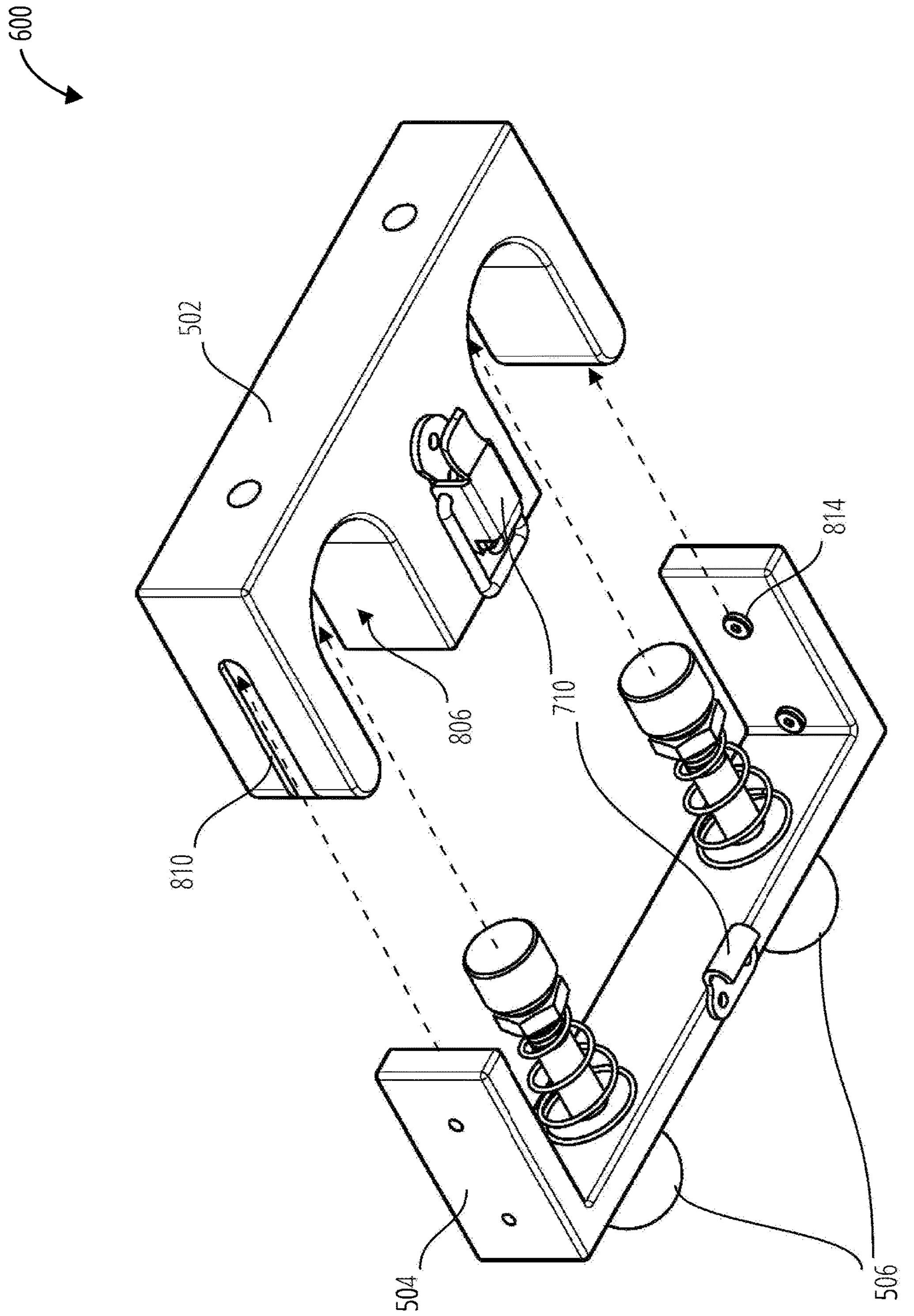
FIG. 9 illustrates a bottom perspective assembly view of an embodiment of a pinball-style tube holder 600 in an open position.
Figure 10:
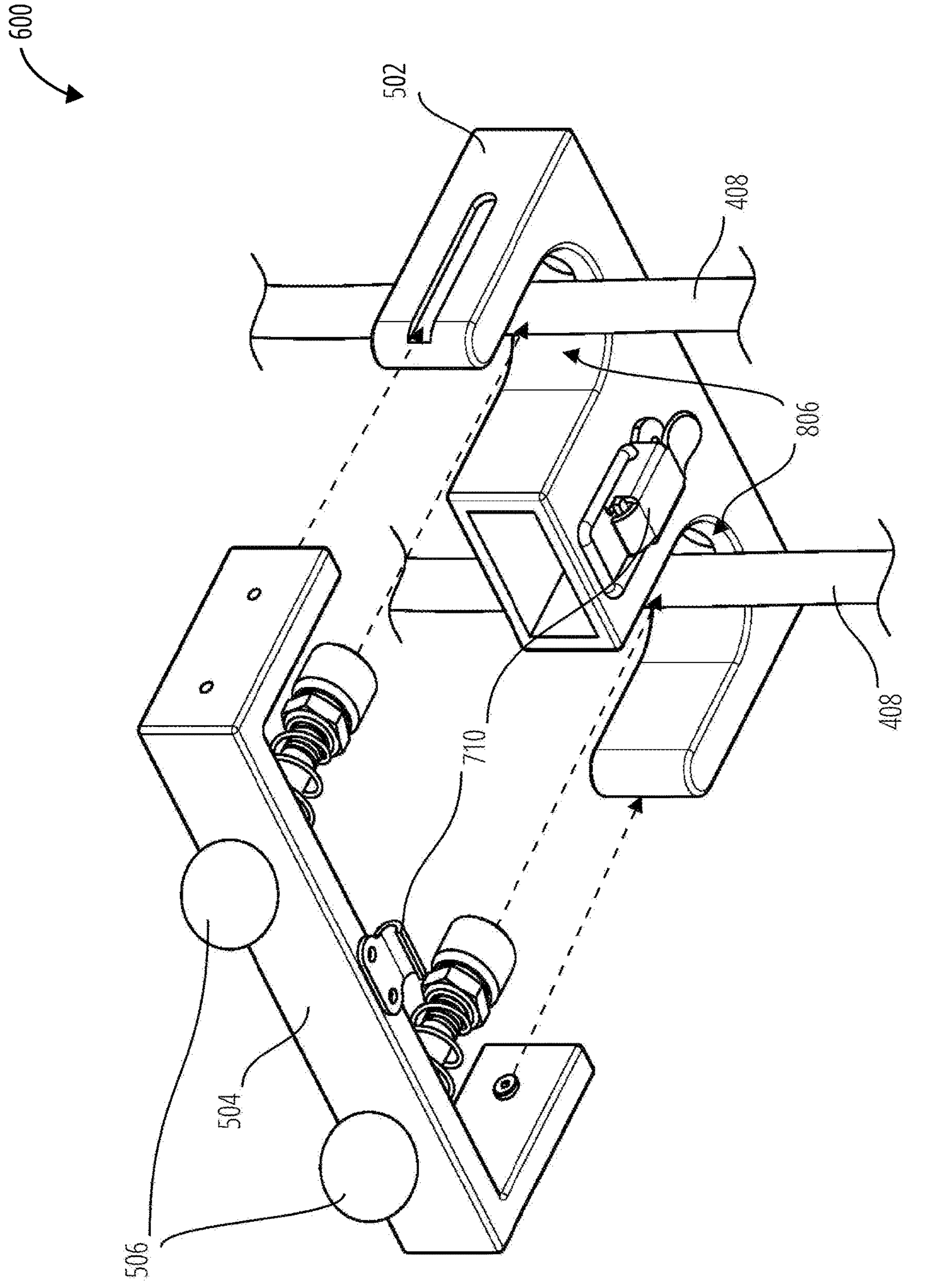
FIG. 10 illustrates a bottom perspective assembly view of an embodiment of a pinball-style tube holder 600 in an open position.
Figure 11:
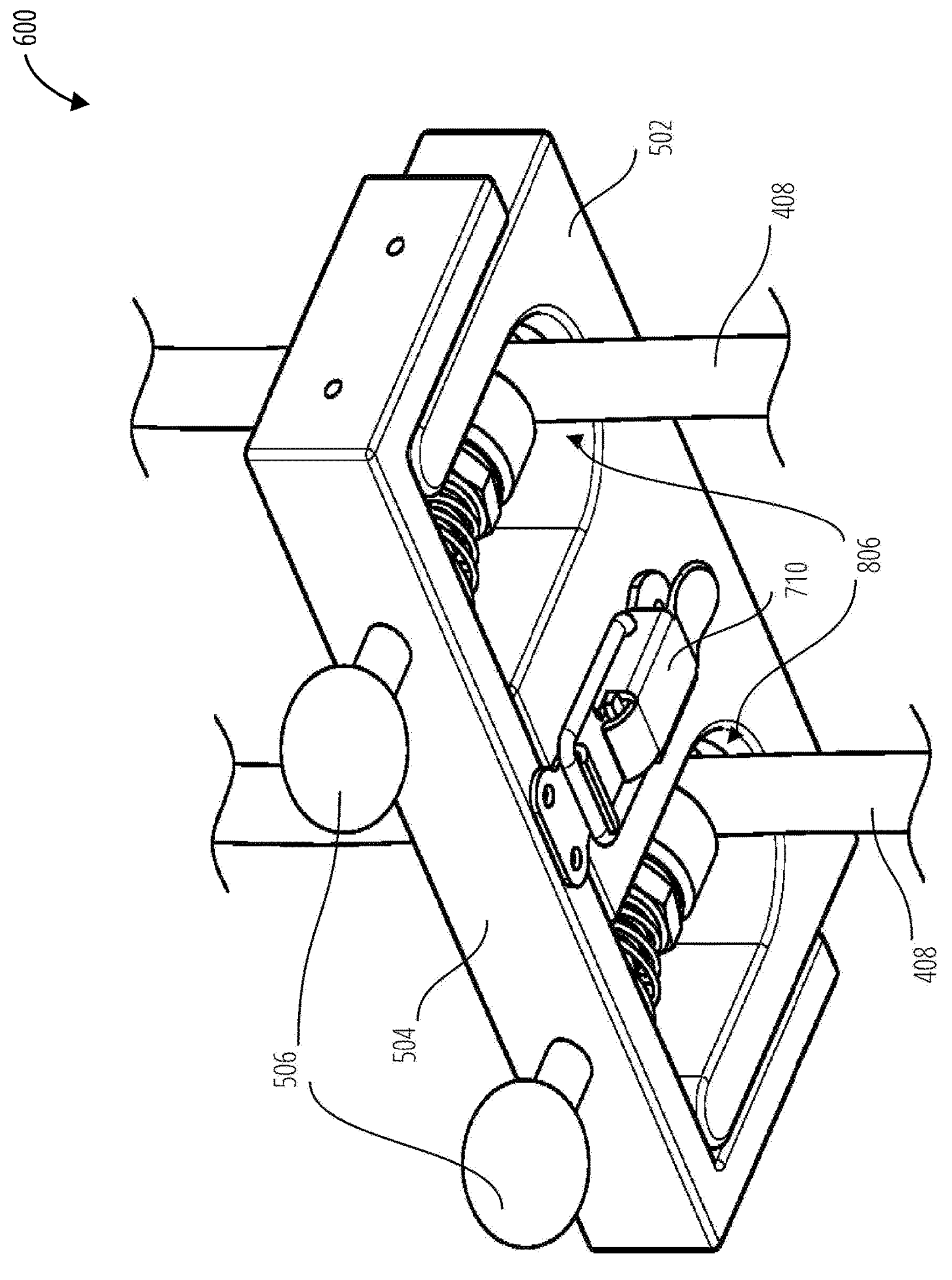
FIG. 11 illustrates a bottom perspective assembly view of an embodiment of a pinball-style tube holder 600 in a closed position.

Referring to FIG. 1-FIG. 5, a liquid dispensing system 100 comprises a rigid housing 102, a positioning apparatus 104, and a flexible container 400.

The rigid housing 102 may comprise sidewalls 302 and a floor 304 to form a cavity 202 into which the flexible container 400 may be placed. The sidewalls 302 may be upstanding on the exterior surface and sloped from the top of the rigid housing 102 to the floor 304 of the rigid housing 102 on the interior surface. The slope and the contour of the sidewalls 302 and the position of the floor 304 relative to the top of the rigid housing 102 determines the shape of the cavity 202 into which the flexible container 400 may be placed. The liquid dispensing system 100 may have further structural elements to alter the height off the floor 304 and to provide transportability.

The flexible container 400 may comprise a compartment 402 that may hold a liquid 406 and may have one or more opening 404. One of more tubular members 408 may be coupled to the compartment 402 at each opening 404. The liquid 406 may flow from the compartment 402 through the opening 404 and into the tubular member 408, which conveys the liquid from the interior of the compartment 402 to the exterior of the compartment 402, removing the liquid from the flexible container 400. The flow of the liquid 406 may be regulated by the retention device 410. The flexible container 400 may be shaped similar to a cube with panels that are welded together on each corner. The flexible container 400 may further have ports, tubes, tabs, etc. As depicted, the flexible container 400 has a top portion 412 that is open. In other embodiments, the top portion 412 may be closed. The flexible container 400 may have further components that may attach to the rigid housing 102, or a component of the rigid housing 102, such as a hoist (not depicted), to position and orient the flexible container 400 within the rigid housing 102. Multiple flexible containers 400 may be placed within the rigid housing 102. The flexible container 400 may be placed within the cavity 202 of the rigid housing 102 and conform to the shape of the cavity 202 as determined by the rigid housing 102.

The positioning apparatus 104 is affixed to the rigid housing 102. The positioning apparatus 104 may act as a support by contacting and restraining one or more objects, such as the tubular member 408. The one or more positioning apparatus 104 may be affixed to the rigid housing 102. The positioning apparatus 104 may further comprise a base plate 502, an attachment plate 504, and a securing element 506. The base plate 502 may be affixed to the rigid housing 102. The attachment plate 504 may be aligned to the base plate 502 and secured to the base plate 502. The securing element 506 may extend from the attachment plate 504 and be configured to retract toward the attachment plate 504. The base plate 502 and the securing element 506 are adapted to restrain movement of the tubular member 408 when the positioning apparatus 104 is altered from an open position to a closed position. Exemplary embodiments of the positioning apparatus 104 are depicted as the pinball-style tube holder 600, the screw-style tube holder 1200, and the cover-style tube holder 1400 in reference to FIG. 6-FIG. 15.

Referring to FIG. 6-FIG. 11, a pinball-style tube holder 600 is depicted in various views and positions. The pinball-style tube holder 600 comprises a base plate 502, an attachment plate 504, a securing element 506, and a latch 710.

The base plate 502 comprises a perimeter 602 that joins a top surface 604 to a bottom surface 702. The perimeter 602 has a back portion 704, a curvature 802, and one or more sidewalls 808. The curvature 802 encircles and defines the hollow portions 804 of the base plate 502. The curvature 802 and the hollow portions 804 form the receivers 806. As depicted the base plate 502 has a second curvature encircling and defining a second hollow portion forming a second receiver. Each of the receivers 806 may receive a tubular member 408. In some embodiments, the base plate 502 may comprise a single receiver or multiple receivers. Each sidewall 808 may comprise a guide 810. The guide 810 may be mounted onto an indentation into the sidewall 808 and extend from the front of the base plate 502 toward the back portion 704 of the base plate 502. Each guide 810 may be configured to receive a protrusion 814.

The attachment plate 504 comprises a perimeter 606, a top surface 608, and a bottom surface 706. The perimeter 606 is formed by a base 610 with an exterior surface 616 and an interior surface 708, and one or more sidewalls 612. The base 610 may have openings 812 from the exterior surface 616 to the interior surface 708. Each securing element 506 may be placed into one of the openings 812 and extend from both the interior surface 708 and the exterior surface 616 of the base 610. The openings 812 may have opposing threads that match the threads 822 of the securing element 506. Each sidewall 612 may comprise one or more openings 614 into which a protrusion 814 may be mounted and secured. A portion of a protrusion 814 may be secured to one of the openings 614. The portion may be the threads 816 matching and engaging opposing threads in the openings 614 in some embodiments, or may be a peg utilizing friction in the openings 614 in other embodiments. Each protrusion 814 is configured to engage a guide 810 of the base plate 502.

The securing element 506 comprises body 818 having a first end and a second end with a knob 820 at the first end and threads 822 at the second end. The knob 820, in this embodiment, is configured in an ergonomic design to be grasped by a user and pulled away from the exterior surface 616 of the base 610 of the attachment plate 504. The securing element 506 further comprises a tube contact 824 affixed to the second end of the body 818, a nut 826, and an elastic element 828. The elastic element 828 is secured between the nut 826 and the interior surface 708 of the base 610 of the attachment plate 504.

A tubular member 408 may be placed within one of the receivers 806 while the pinball-style tube holder 600 is in the open position. Each protrusion 814 is then aligned with a corresponding guide 810. When aligned as such, the securing element 506 is aligned with one of the receivers 806. In embodiments with multiple securing element 506 and receivers 806, each securing element 506 is aligned with a corresponding one of the receivers 806. Each protrusion 814 is then inserted into the corresponding guide 810 to place the pinball-style tube holder 600 into the closed position. While in the closed position, the tubular member 408 may physically contact one of the receivers 806 and the tube contact 824 of the securing element 506. The tube contact 824 may engage the nut 826 and the elastic element 828 to secure the tubular member 408.

The pinball-style tube holder 600 may further comprise a latch 710. The latch 710 comprises a clasp 712, a swing arm 714, and a catch 716. The clasp 712 is affixed to the bottom surface 702 of the base plate 502 and the catch 716 is affixed to the bottom surface 706 of the attachment plate 504 opposed to the clasp 712. The swing arm 714 is moveable from a first position to a second position to engage the catch 716, which helps fixation of the pinball-style tube holder 600 in the closed position. In other embodiments, the latch 710 further comprises a lock. The lock acts to help inhibit the latch 710 from disengaging (i.e., the swing arm 714 separating from the catch 716) during operation in various configurations, such as in embodiments where the clasp 712 is affixed to the top surface 604 of the base plate 502 and the catch 716 is affixed to the top surface 608 of the attachment plate 504. The clasp 712 may also comprise a spring-loaded first tab engaging a second tab. The spring-loaded first tab and the second tab help inhibit the latch 710 from disengaging during operation of the pinball-style tube holder 600.

Figure 12:
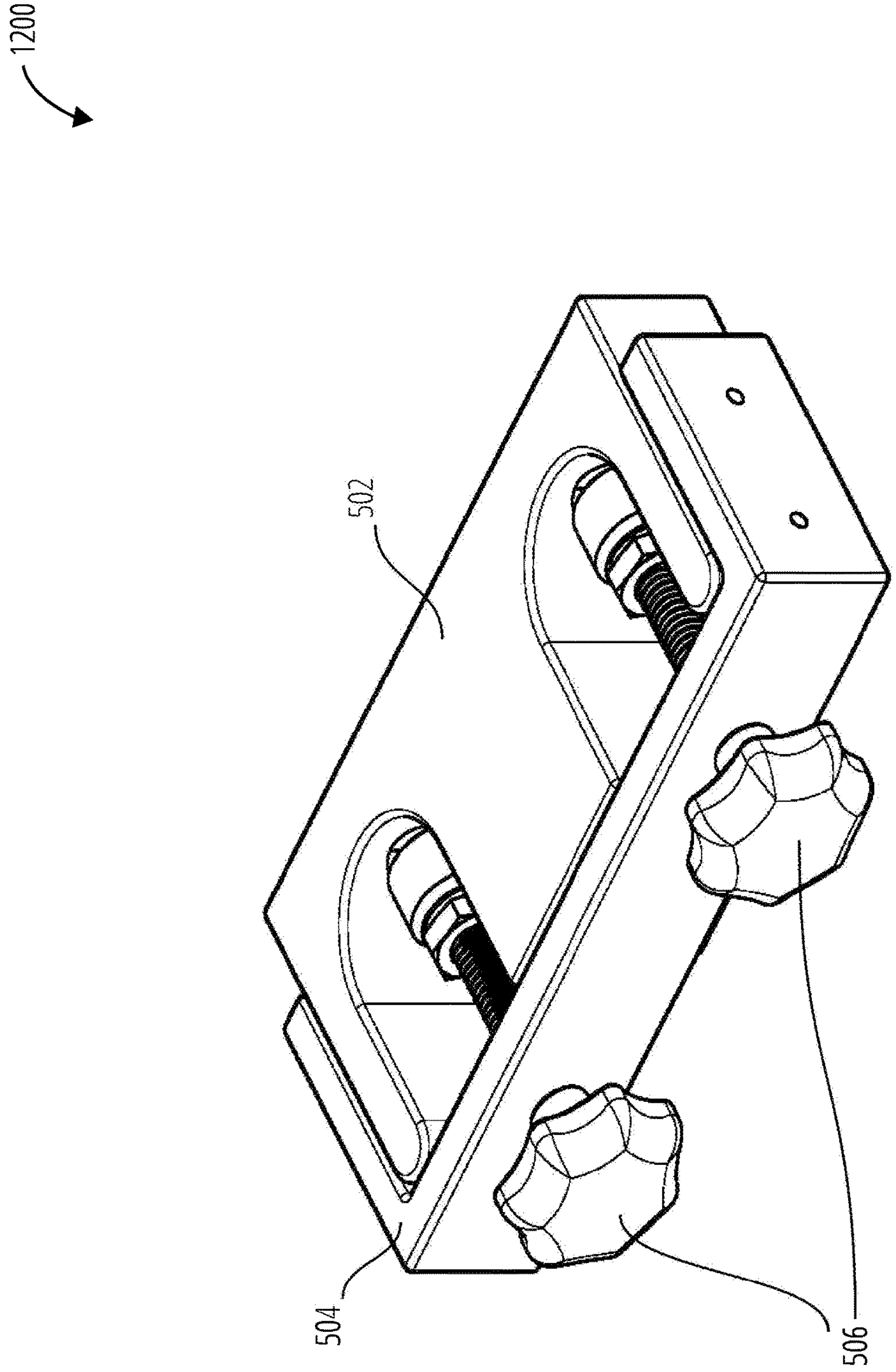
FIG. 12 illustrates a top perspective assembly view of an embodiment of a screw-style tube holder 1200 in the closed position.
Figure 13:
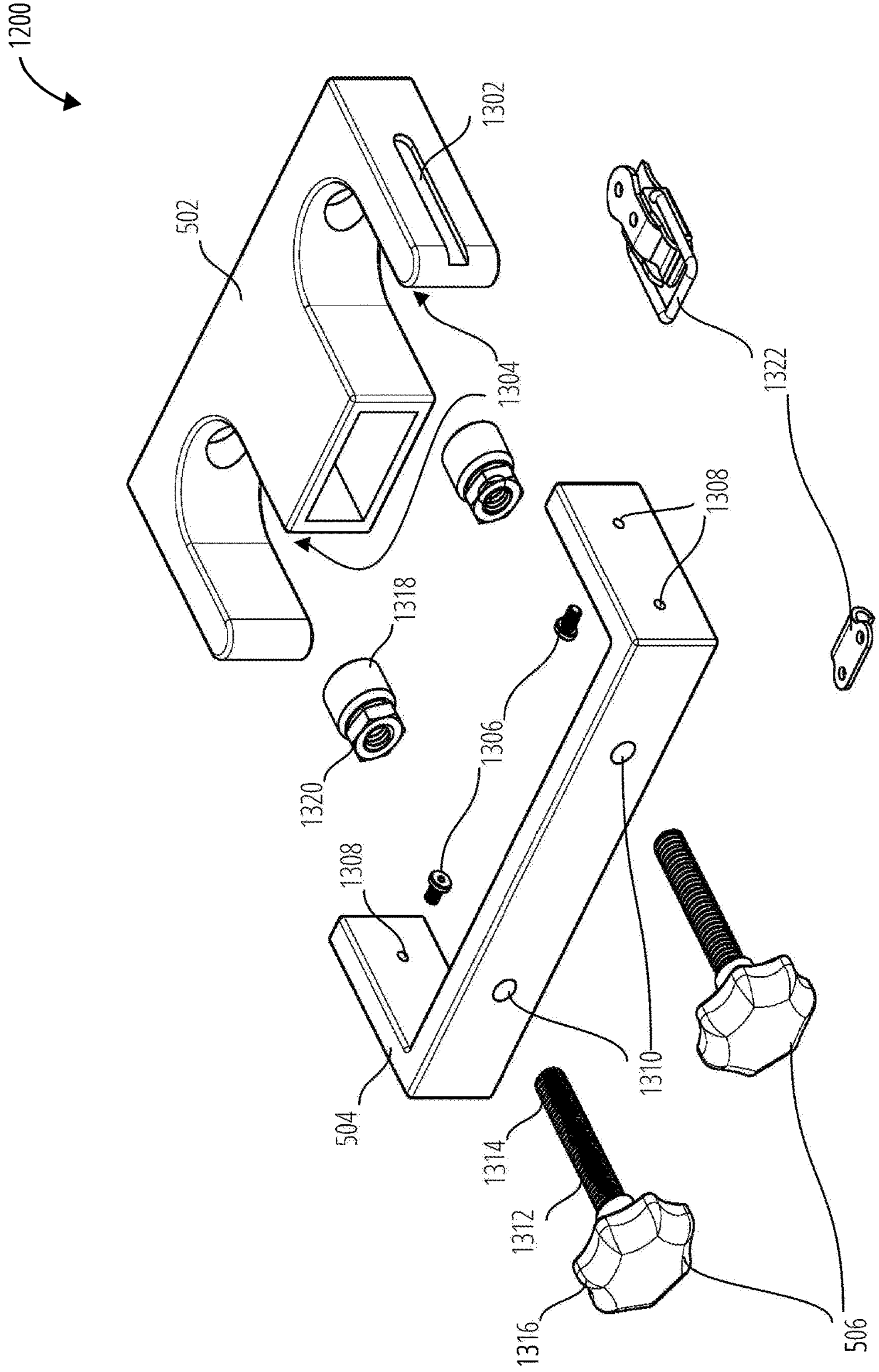
FIG. 13 illustrates a top perspective exploded view of an embodiment of a screw-style tube holder 1200.

Referring to FIG. 12 and FIG. 13, a screw-style tube holder 1200 is depicted in an assembled view and an exploded view. The screw-style tube holder 1200 comprises a base plate 502, an attachment plate 504, a securing element 506, and a latch 1322.

The base plate 502 comprises a perimeter joining a top surface to a bottom surface. The base plate 502 also comprises a guide 1302 and receivers 1304. The base plate 502 may have a second guide (not depicted). The guide 1302 may be mounted onto or indented into the base plate 502, extending from the front to the back of the base plate 502. The base plate 502 may comprise more than one guide 1302. For example, a guide 1302 may be located on each side of the base plate 502. Each guide 1302 may be configured to receive one of the protrusions 1306 of the attachment plate 504. Each of the receivers 1304 receive a tubular member 408, which may then be secured to the receivers 1304 by the securing element 506.

The attachment plate 504 may comprise a perimeter joining a top surface to a bottom surface, as well as one or more protrusions 1306, wherein each of the protrusions 1306 may be mounted and secured to one of the openings 1308 in the perimeter. The protrusions 1306 may have a peg that is secured by friction to the openings 1308 or have threads that match and secure to opposing threads in the openings 1308. The attachment plate 504 also comprises openings 1310. The openings 1310 may have opposing threads that match the threads 1314 of the securing element 506.

The securing element 506 comprises a body 1312, threads 1314, a knob 1316, a tube contact 1318, and a nut 1320. The body 1312 has a first end and a second end. The first end has the knob 1316, which may be adjacent to the exterior surface of the base of the attachment plate 504. In this embodiment, the knob 1316 is configured in an ergonomic design to be grasped by a user and rotated to engage the threads 1314 with the matching opposing threads in the openings 1310 thereby translating the tube contact 1318 of the securing element 506 either toward or away from the base of the attachment plate 504. When aligned with a base plate 502 with a tubular member 408 within the receivers 1304, the tube contact 1318 may be translated toward the tubular member 408. The movement of the tubular member 408 is then restrained by physically contacting the tube contact 1318 and the receivers 1304.

The latch 1322 comprises a clasp, a swing arm, and a catch. The clasp is affixed to the base plate 502, and the catch is affixed to the attachment plate 504 opposed to the clasp. The swing arm is moveable from a first position to a second position to engage the catch, which acts to fix the screw-style tube holder 1200 in the closed position. In other embodiments, the latch 1322 comprises a lock. The lock acts to help inhibit the latch 1322 from disengaging (i.e., the swing arm separating from the catch) during operation in various configurations, such as in embodiments where the clasp is affixed to the top surface of the base plate 502 and the catch is affixed to the top surface of the attachment plate 504. The clasp may also comprise a spring-loaded first tab engaging a second tab. The spring-loaded first tab and the second tab help inhibit the latch 1322 from disengaging during operation of the screw-style tube holder 1200.

Figure 14:
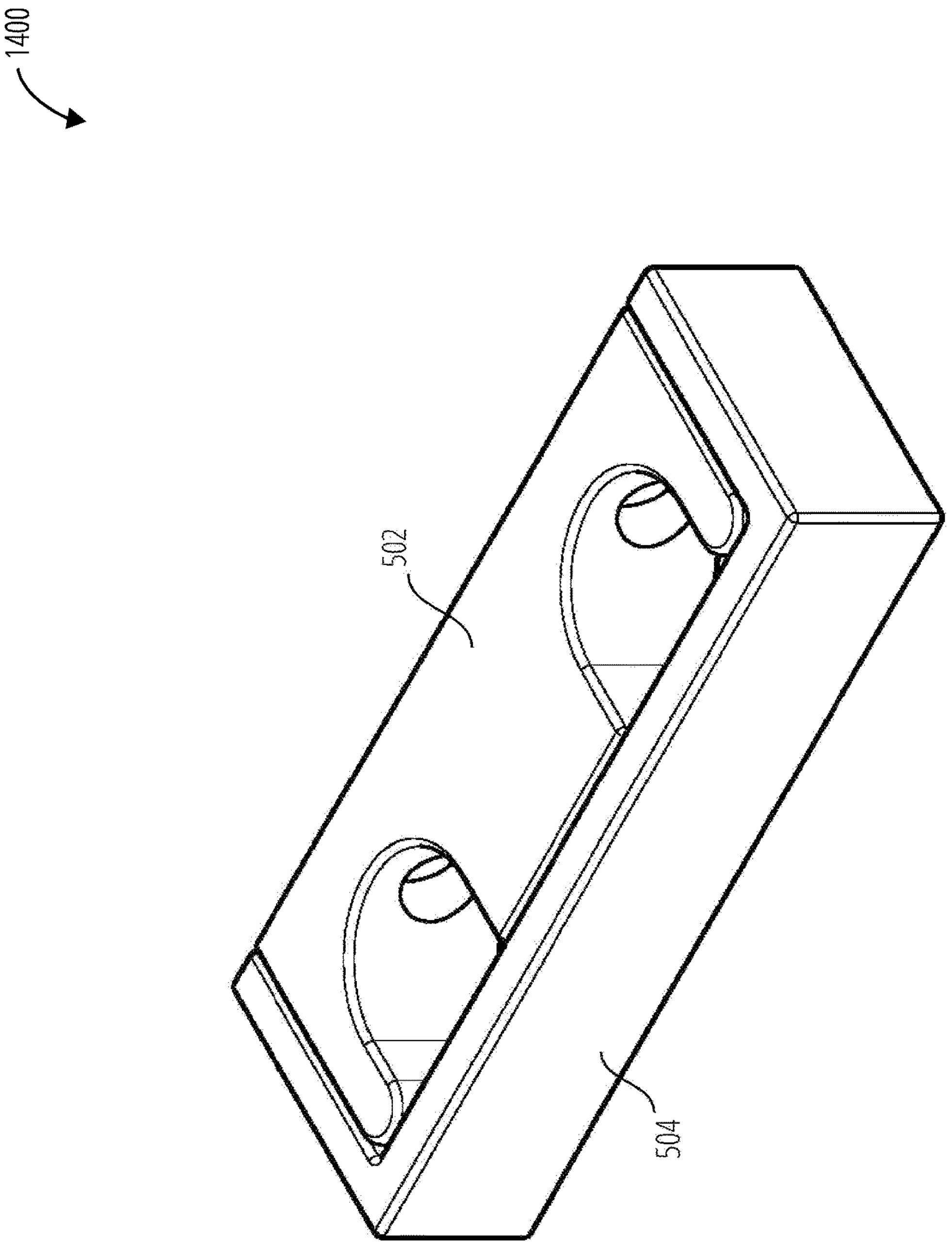
FIG. 14 illustrates a top perspective assembly view of an embodiment of a cover-style tube holder 1400 in a closed position.
Figure 15:
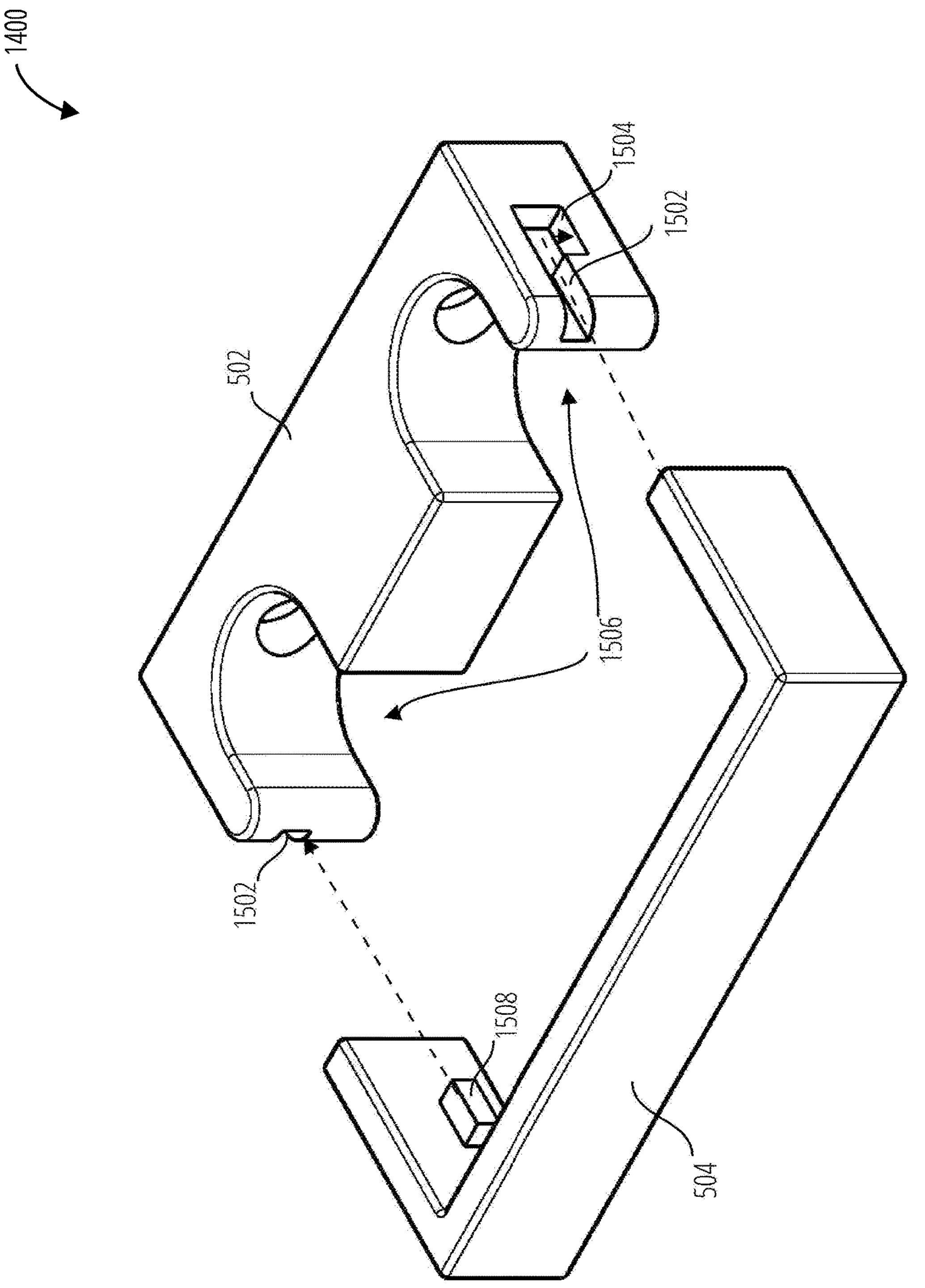
FIG. 15 illustrates a top perspective assembly view of an embodiment of a cover-style tube holder 1400 in an open position.

Referring to FIG. 14 and FIG. 15, a cover-style tube holder 1400 is depicted in a closed position and an open position. The cover-style tube holder 1400 comprises a base plate 502 and an attachment plate 504. In this embodiment, a securing element 506 is absent, with the tubular member 408 being secured between the base plate 502 and the attachment plate 504.

The base plate 502 comprises a perimeter joining a top surface to a bottom surface. The base plate 502 comprises guides 1502, each of which having a notch 1504. The guides 1502 and each notch 1504 may be mounted onto or indented into the sidewalls of the base plate 502. The guides 1502 and notch 1504 receive the protrusion 1508 of the attachment plate 504. The protrusion 1508 slides along the corresponding guide until it is aligned with the notch 1504. The protrusion 1508 then slides into the corresponding notch 1504. The notch 1504 may be oriented below its guide to utilize gravity to help maintain the closed position. Each protrusion 1508 may be offset relative to the guides 1502, such that as each protrusion 1508 is sliding through the guides 1502, the attachment plate 504 is offset relative to the base plate 502. When each protrusion 1508 slides into its corresponding notch 1504, the top surfaces and bottom surfaces of the attachment plate 504 and the base plate 502 may be even with each other. The base plate 502 may further comprise one or more receivers 1506. Each of the receivers 1506 may receive a tubular member 408. The tubular member 408 may be secured by the attachment plate 504 in the closed position.

The attachment plate 504 may comprise a perimeter joining a top surface to a bottom surface, as well as one or more protrusions 1508, wherein each protrusion 1508 may be mounted and secured to the perimeter. In some embodiments, each protrusion 1508 is integral to the perimeter of the attachment plate 504. The protrusion 1508 may also be a peg that is secured by friction to an opening or indentation in the perimeter of the attachment plate 504.

In some embodiments, a latch is utilized to maintain the base plate 502 and the attachment plate 504 in the closed position. The latch may have a clasp attached to the base plate 502 and an opposing catch attached to the attachment plate 504. A swing arm affixed to the clasp is moveable from a first position to a second position to engage the catch.

Figure 16:
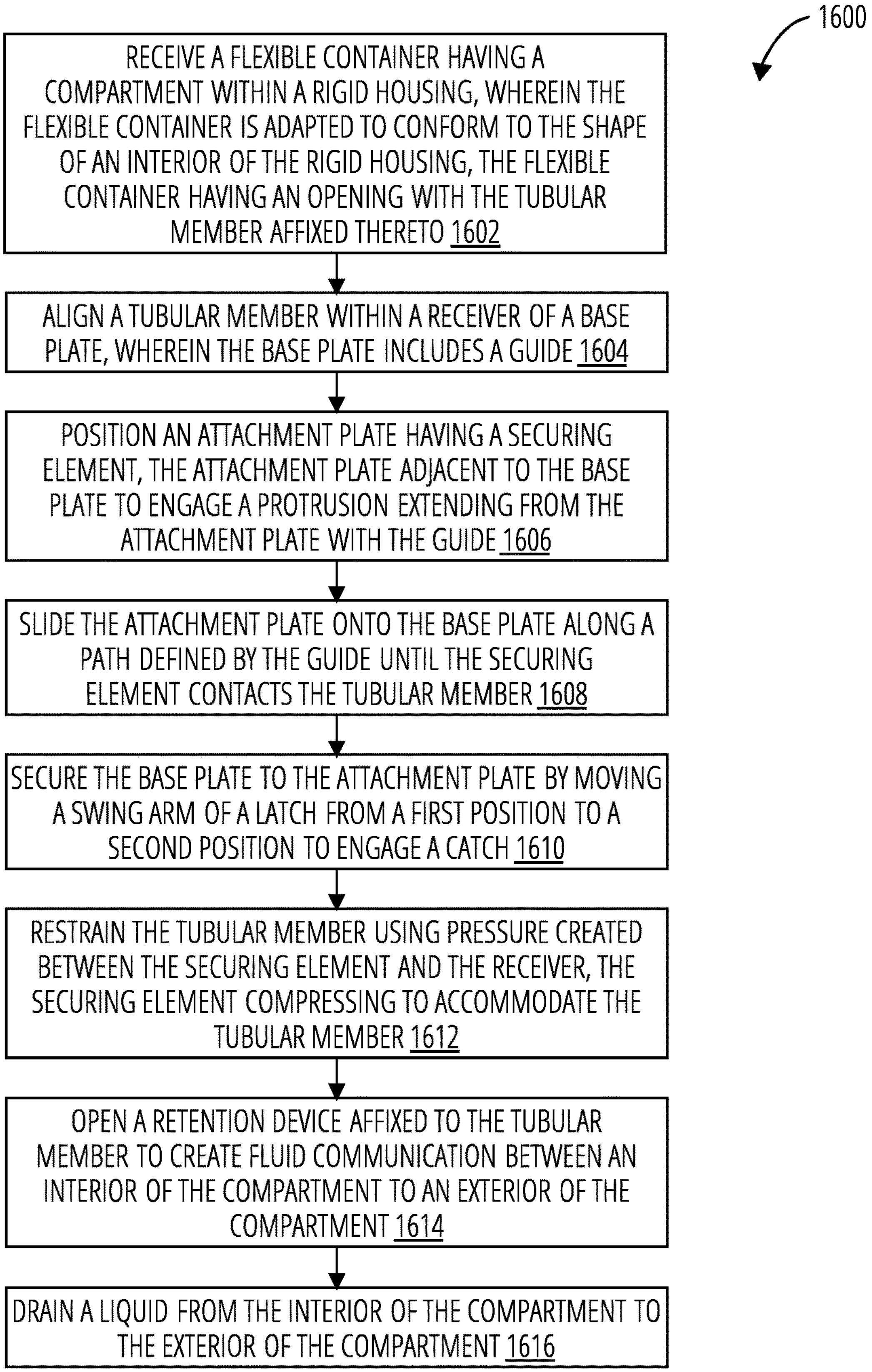
FIG. 16 illustrates an embodiment of a method 1600.

Referring to FIG. 16, a method 1600 comprises a flexible container having a compartment is received within a rigid housing, wherein the flexible container is adapted to conform to the shape of an interior of the rigid housing, the flexible container having an opening with the tubular member affixed thereto (block 1602). A tubular member is aligned within a receiver of a base plate, wherein the base plate includes a guide (block 1604). An attachment plate having a securing element, the attachment plate adjacent to the base plate is positioned to engage a protrusion extending from the attachment plate with the guide (block 1606). The attachment plate is slid onto the base plate along a path defined by the guide until the securing element contacts the tubular member (block 1608). The base plate is secured to the attachment plate by moving a swing arm of a latch from a first position to a second position to engage a catch (block 1610). The tubular member is restrained using pressure created between the securing element and the receiver, the securing element compressing to accommodate the tubular member (block 1612). A retention device affixed to the tubular member is opened to create fluid communication between an interior of the compartment to an exterior of the compartment (block 1614). A liquid is drained from the interior of the compartment to the exterior of the compartment (block 1616).

Figure 17:
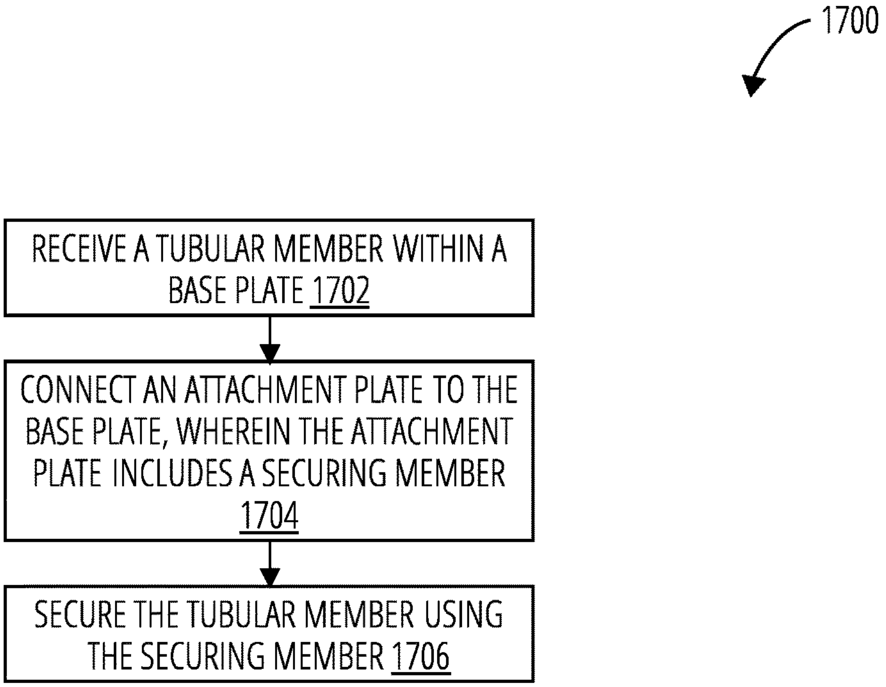
FIG. 17 illustrates an embodiment of a method 1700.

Referring to FIG. 17, a method 1700 comprises a tubular member received within a base plate (block 1702). An attachment plate is connected to the base plate, wherein the attachment plate includes a securing member (block 1704). The tubular member is secured using the securing member (block 1706).

Figure 18:
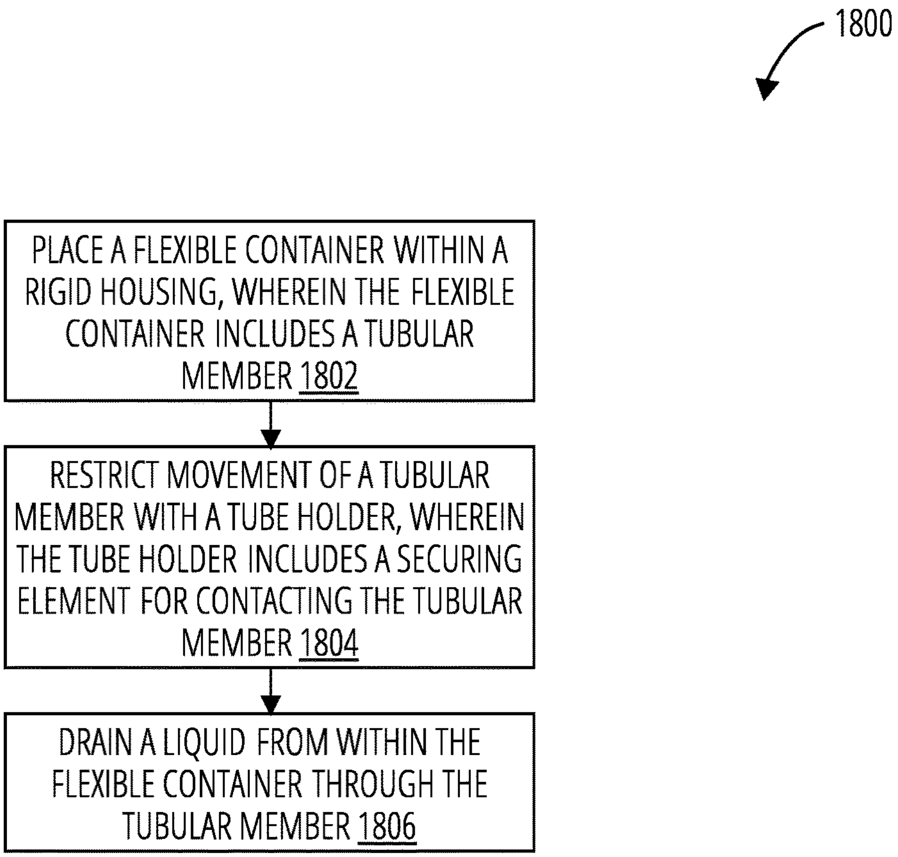
FIG. 18 illustrates an embodiment of a method 1800.

Referring to FIG. 18, a method 1800 comprises a flexible container placed within a rigid housing, wherein the flexible container includes a tubular member (block 1802). Movement of a tubular member is restricted with a tube holder, wherein the tube holder includes a securing element for contacting the tubular member (block 1804). A liquid from within the flexible container is drained through the tubular member (block 1806).

What is claimed is:

1. A liquid dispensing system, comprising:

a rigid housing having a floor and an upstanding sidewall forming a cavity;

a container housed in the cavity of the rigid housing and having one or more tubular members extending therefrom;

a positioning apparatus configured to restrain the one or more tubular members, the positioning apparatus comprising:

a base plate having a first receiver to receive at least one tubular member, and a guide slot; and an attachment plate having a protrusion configured to engage the guide slot, thereby aligning the base plate and the attachment plate, wherein the first receiver is captured between the base plate and the attachment plate when the protrusion engages the guide slot.

2. The liquid dispensing system of claim 1, wherein the sidewall is upstanding on an exterior surface and sloped from a top of the rigid housing to the floor of the rigid housing on an interior surface.

3. The liquid dispensing system of claim 1, wherein the container has one or more openings, each opening configured to couple to the one or more tubular members.

4. The liquid dispensing system of claim 1, wherein the container holds a liquid.

5. The liquid dispensing system of claim 4, further comprising a retention device coupled to the tubular member, the retention device regulating a flow of the liquid through the tubular member.

6. The liquid dispensing system of claim 5, wherein the retention device is a clamp.

7. The liquid dispensing system of claim 1, further comprising a securing element, extending from the attachment plate and configured to retract toward the attachment plate.

8. The liquid dispensing system of claim 7, wherein a portion of the securing element is in physical contact with the tubular member in the first receiver.

9. The liquid dispensing system of claim 7, further comprising a latch that releasably secures the attachment plate to the base plate.

10. A method of dispensing a liquid, comprising:

housing a container within a rigid housing, wherein the container is connected to a tubular member;

positioning the tubular member within a receiver of a base plate, the base plate being coupled to the housing;

positioning an attachment plate in alignment to the base plate to restrain movement of the tubular member;

releasably securing the base plate to the attachment plate by a latch device; and dispensing the liquid from within the container through the tubular member.

11. The method of dispensing a liquid of claim 10, wherein the container is adapted to conform to the shape of an interior of the rigid housing.

12. The method of dispensing a liquid of claim 10, wherein a protrusion of the attachment plate is configured to engage a guide slot of the base plate.

13. The method of dispensing a liquid of claim 10, wherein the attachment plate includes a securing element.

* * * * *